(12) United States Patent
Goodman et al.

(10) Patent No.: US 11,360,780 B2
(45) Date of Patent: Jun. 14, 2022

(54) INSTRUCTION-LEVEL CONTEXT SWITCH IN SIMD PROCESSOR

(71) Applicant: Apple Inc., Cupertino, CA (US)

(72) Inventors: Benjiman L. Goodman, Cedar Park, TX (US); Terence M. Potter, Austin, TX (US); Anjana Rajendran, Austin, TX (US); Jeffrey T. Brady, Orlando, FL (US); Brian K. Reynolds, Austin, TX (US); Jeffrey A. Lohman, Winter Park, FL (US)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 16/749,618

(22) Filed: Jan. 22, 2020

(65) Prior Publication Data

US 2021/0224072 A1 Jul. 22, 2021

(51) Int. Cl.
*G06F 9/38* (2018.01)

(52) U.S. Cl.
CPC .......... *G06F 9/3867* (2013.01); *G06F 9/3804* (2013.01); *G06F 9/3887* (2013.01)

(58) Field of Classification Search
CPC .. G06F 9/38767; G06F 9/3804; G06F 9/3887; G06F 9/3867; G06F 9/48;
(Continued)

(56) References Cited

U.S. PATENT DOCUMENTS

| 9,354,892 | B2 | 5/2016 | Rogers et al. | |
| 2009/0307704 | A1* | 12/2009 | Munshi | G06F 9/5044 718/104 |

(Continued)

FOREIGN PATENT DOCUMENTS

WO 2013/081975 A1 6/2013

OTHER PUBLICATIONS

Tanasic et al, "Enabling Preemptive multiprogramming on GPUs," in ACM SIGARCH Computer Architecture News, vol. 42, No. 3, Jun. 2014. (Year: 2014).*

(Continued)

*Primary Examiner* — Jennifer Mehmood
*Assistant Examiner* — Donna J. Ricks
(74) *Attorney, Agent, or Firm* — Kowert, Hood, Munyon, Rankin & Goetzel, P.C.

(57) ABSTRACT

Techniques are disclosed relating to context switching in a SIMD processor. In some embodiments, an apparatus includes pipeline circuitry configured to execute graphics instructions included in threads of a group of single-instruction multiple-data (SIMD) threads in a thread group. In some embodiments, context switch circuitry is configured to atomically: save, for the SIMD group, a program counter and information that indicates whether threads in the SIMD group are active using one or more context switch registers, set all threads to an active state for the SIMD group, and branch to handler code for the SIMD group. In some embodiments, the pipeline circuitry is configured to execute the handler code to save context information for the SIMD group and subsequently execute threads of another thread group. Disclosed techniques may allow instruction-level context switching even when some SIMD threads are non-active.

20 Claims, 8 Drawing Sheets

(58) Field of Classification Search
CPC ............. G06F 9/30032; G06F 9/30043; G06F 9/30123; G06F 9/461; G06F 9/30101; G06F 9/3009; G06F 9/3851
See application file for complete search history.

(56) References Cited

U.S. PATENT DOCUMENTS

| | | |
|---|---|---|
| 2013/0124838 A1 | 5/2013 | Shah et al. |
| 2013/0187935 A1* | 7/2013 | Wexler .................. G06F 9/5027 345/505 |
| 2014/0157287 A1 | 6/2014 | Howes et al. |
| 2015/0363903 A1* | 12/2015 | Orr .......................... G06T 1/20 345/522 |
| 2016/0140686 A1 | 5/2016 | Lueh et al. |
| 2017/0221173 A1* | 8/2017 | Acharya ................ G06F 9/4887 |
| 2017/0249151 A1 | 8/2017 | Cuadra et al. |
| 2018/0293692 A1 | 10/2018 | Koker et al. |
| 2020/0004959 A1* | 1/2020 | Chappell ............. G06F 12/0875 |

OTHER PUBLICATIONS

International Search Report and Written Opinion in PCT Appl. No. PCT/US2021/013989 dated May 10, 2021, 14 pages.

* cited by examiner

INSTRUCTION-LEVEL CONTEXT SWITCH IN SIMD PROCESSOR

BACKGROUND

Technical Field

This disclosure relates generally to SIMD processor architecture and more particularly to techniques for instruction-level context switches.

Description of the Related Art

Traditionally, a GPU context switch might prevent new work from being sent to shader units but wait for in-flight threads to complete before using shader resources for a new thread. Context switch latency may be important, because a new context may have real-time execution requirements. Long-running background compute tasks, for example, may cause substantial latency. Because graphics threads are typically executed using single-instruction multiple-data (SIMD) techniques, saving architectural state for context switching may be challenging.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "programmable shader circuit configured to execute a shader program" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Graphics Processing Overview

Figure 1A:
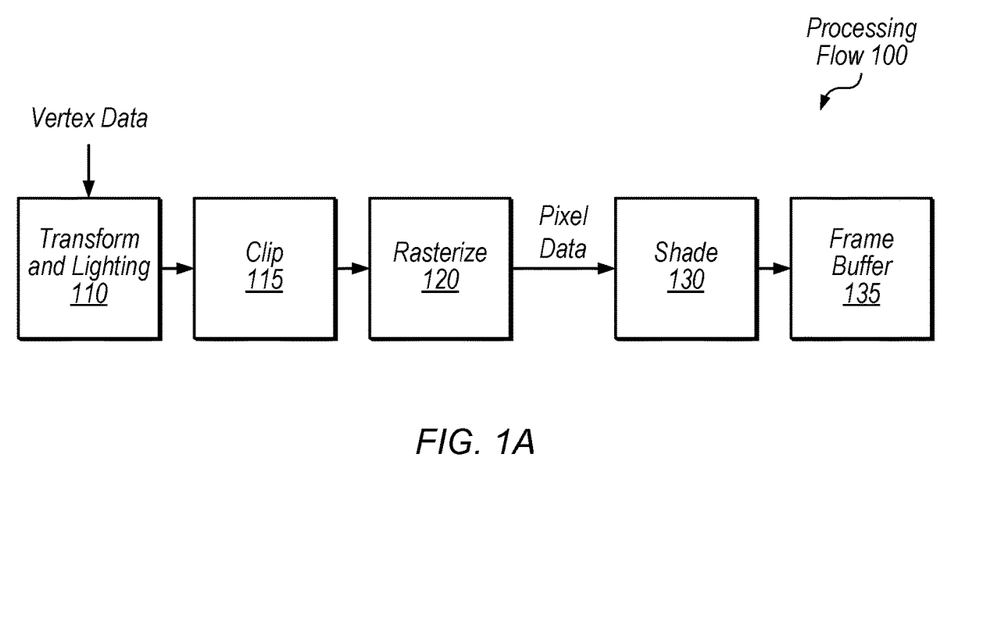
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the example elements of FIG. 1A may be performed in various orders, performed in parallel, or omitted. Additional processing steps may also be implemented.

Figure 1B:
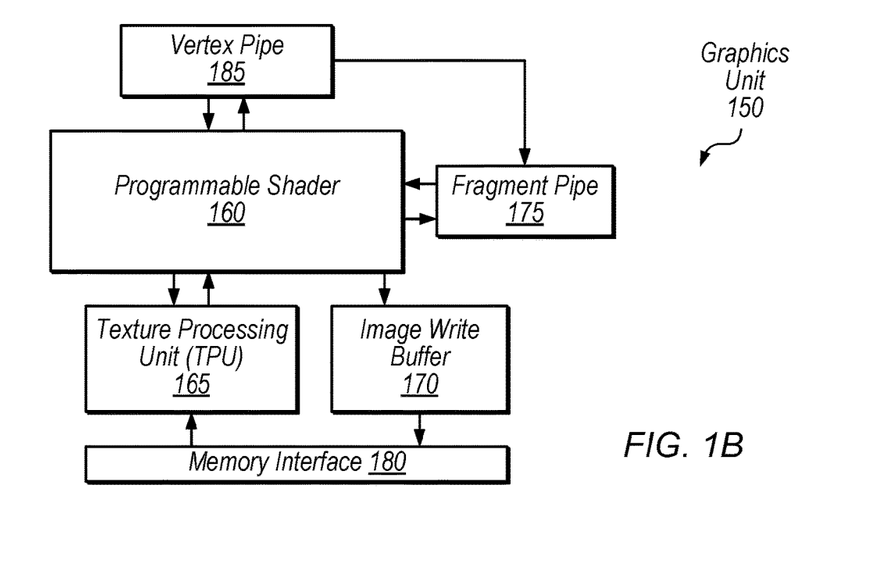
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview of Instruction Level Preemption

The latency for graphics processing hardware to respond to a request to context switch a currently-running application may be important, e.g., when the new context has real-time execution requirements. Context switch latency may be particularly important when the current context is a long-running background application such as a photo categorization task, for example. In some implementations, a GPU may stop work from being launched to the shader core but allow already-executing threads to complete execution before context switching. In these implementations, the shader program runtime may directly contribute to latency needed to complete a context save.

In embodiments discussed below, a graphics unit supports instruction-level context switches rather than allowing currently-executing threads to complete. In some embodiments, this may provide an upper bound on context switch latency. In these embodiments, threads may save off their architectural state to memory as part of a context store and read back their architectural state during a context restore. In some embodiments, an instruction set architecture (ISA) instruction is used for context switches and may be inserted by hardware or included in a shader by the developer. Instruction-level context switching may be particularly complex in the context of single-instruction multiple-data (SIMD) execution where some threads might be invalid or predicated off (or otherwise not currently executing, e.g., due to control flow changes) at the current execution point, but may need to save their state similarly to active threads.

Figure 2:
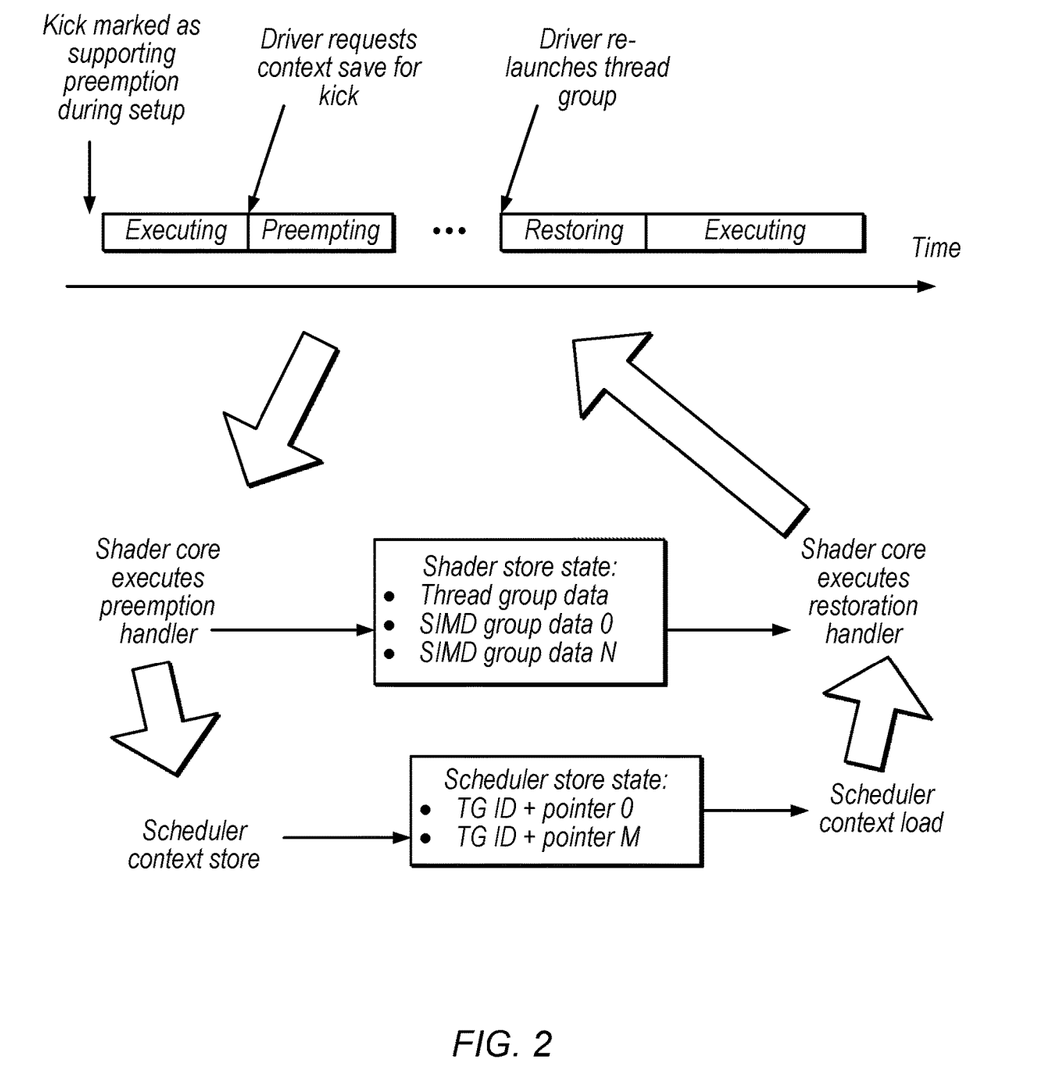
FIG. 2 is a diagram illustrating an example preemption timeline, according to some embodiments.

FIG. 2 is a diagram illustrating example instruction level preemption, according to some embodiments. In the illustrated embodiment, SIMD groups of a graphics kick are preempted during execution and later restored to resume execution. Note that this technique may have reduced context switch latency relative to waiting for SIMD groups to finish before scheduling new work, for example. Further note that various embodiments described herein relate to preemption, but similar techniques may be used for context switches in other scenarios.

In the illustrated embodiment, the kick is marked as supporting preemption during setup. Thus, a graphics unit may execute some kicks that do not support preemption (and will execute until they are completed) and other kicks that do support preemption. Note that a kick may use a context ID to write out data to shared memory when it has finished execution. In the SIMD context, context storing for a kick may store data for a corresponding thread group, which may include multiple SIMD groups (some of which may be finished, some of which may be executing, and some of which may not have yet launched). A given thread group includes threads that execute the same set of instructions but may be split into separate SIMD groups, which may execute using different execution resources. Threads in a SIMD group may share a program counter. SIMD groups may also be referred to as cliques, warps, or wavefronts, for example.

Multiple kicks may be executed to render a frame of graphics data, for example. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy above a certain level until the kick is finished (at which point results may be written to a higher level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of graphics unit 150 are configured to work on a single kick at a time. Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

In the example of FIG. 2, after partial execution of a kick, a graphics driver requests a context save for the kick. At this point, some SIMD groups for the kick may not have been dispatched for execution, but other SIMD groups may be in-flight. In response to the context save request, the kick begins a preemption operation in which the shader cores execute a preemption handler for SIMD groups of a preempted thread group. In the illustrated example, the preemption handler stores shader state that includes thread group data and data for each SIMD group in the thread group. As discussed in further detail below, this process may use a hardware-inserted context switch or preempt instruction of an instruction set architecture (ISA) supported by graphics unit 150, which may use special registers to temporarily store shader state information and then invoke a preemption handler.

In the illustrated embodiment, scheduler circuitry (e.g., a data master for the preempted kick) stores state information for each preempted thread group that identifies the thread group and includes a pointer to a private memory space used to store state information for that thread group.

Once the preemption operation is complete, other thread groups may load their context and use the preempted execution resources. Subsequently, the driver re-launches the preempted thread group(s) and a restoration process begins. In this process, the scheduler circuitry begins a context load using the pointer for a thread group and the shader core executes a restoration handler that retrieves and restores the shader state information stored for the thread group and its SIMD groups. Subsequently, the kick continues executing, e.g., until it is complete or preempted again.

Figure 3:
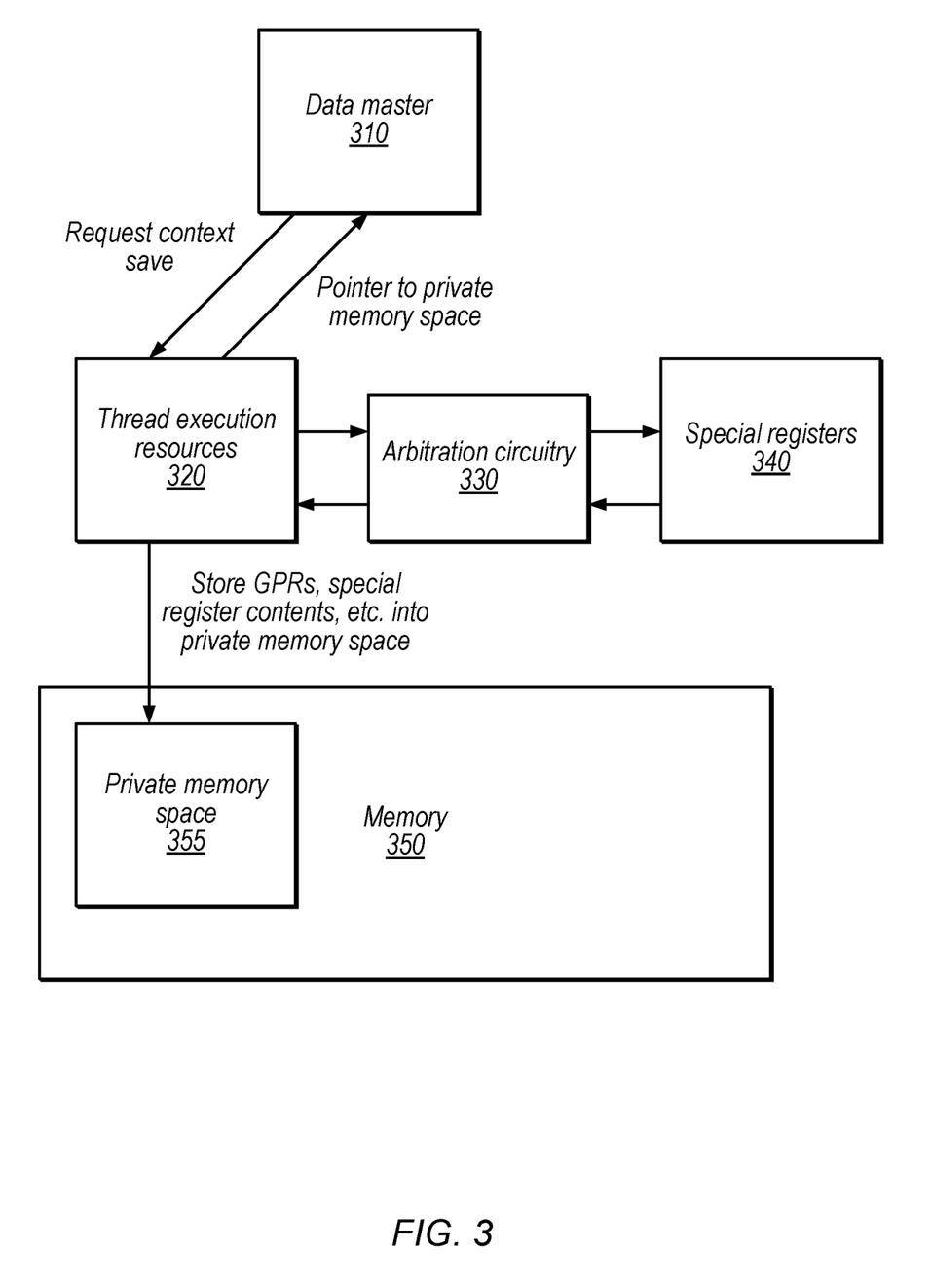
FIG. 3 is a block diagram illustrating circuitry configured to perform an instruction-level context switch for a SIMD group, according to some embodiments.

FIG. 3 is a block diagram illustrating example circuitry configured to perform an instruction-level context switch, according to some embodiments. In the illustrated embodiment, the system includes a data master 310, thread execution resources 320, arbitration circuitry 330, special registers 340, and memory 350.

Data master 310 is one example of scheduler circuitry configured to schedule thread groups for execution using thread execution resources 320 (e.g., portions of programmable shader 160). Data master 310 may be configured to schedule a certain specific type of work, e.g., compute tasks, vertex tasks, or pixel tasks. In embodiments with multiple data masters, each data master may control context switches for kicks that it schedules.

Special registers 340, in some embodiments, are configured to store certain types of information for context switches, such as validity information, predicate information, program counter information, etc. for SIMD groups that are preempted. Speaking generally, these registers may store information indicating whether threads are active; predicate information and validity information are examples of such information. Special registers 340 may also be referred to as context switch registers. In the illustrated embodiment, arbitration circuitry 330 is configured to select from among SIMD groups that are ready to use special registers 340, which may conserve area and reduce power consumption relative to including special registers for each set of hardware configured to execute a SIMD group, for example. Special registers 340 may be particularly useful to ensure that threads that are currently invalid or predicated off still save their shader state, in some embodiments, while still tracking validity and predicate information for when the SIMD groups are re-launched.

Arbitration circuitry 330 may select from among requesting SIMD groups using various algorithms, such as round-robin, an age-based queue, etc. In some embodiments, SIMD groups wait to win arbitration for a set of special registers to become available before executing a preempt instruction.

Memory 350, in the illustrated embodiments, includes private memory space 355 which is allocated for a thread group that is switched out. In the illustrated embodiment, the threads store general purpose register contents, special purpose register contents, and any other state information such as local memory contents to private memory space 355. Data master 310 may maintain a list of preempted thread groups and pointers to their respective private memory spaces in order to re-launch thread groups. In some embodiments, thread execution resources 320 may allocate private memory spaces for thread groups that are context switched out and may deallocate space after restoration has finished.

Example Context Switch Method Using Special Registers

Figure 4:
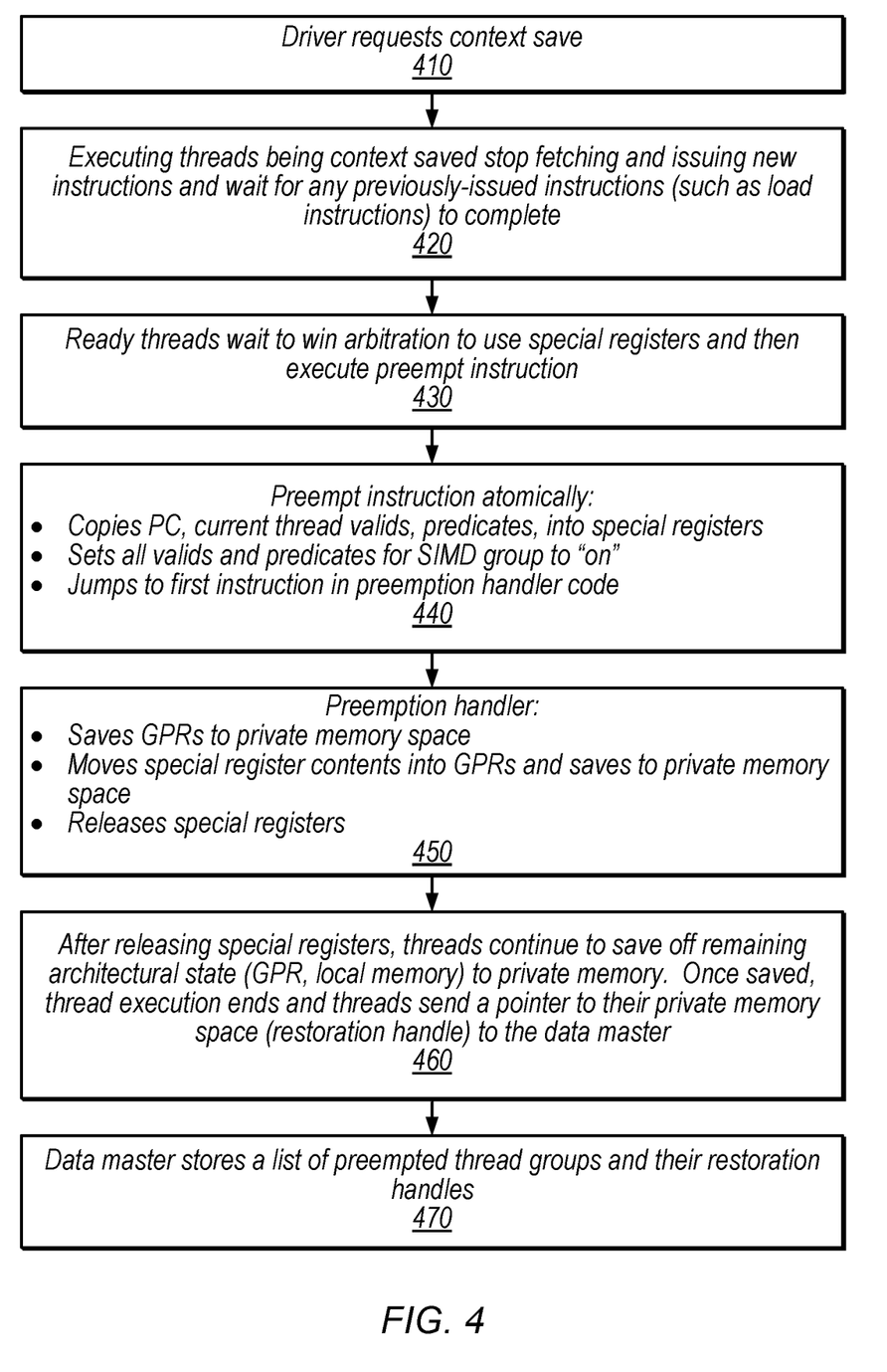
FIG. 4 is a flow diagram illustrating an example method for performing instruction-level preemption using special registers, according to some embodiments.

FIG. 4 is a flow diagram illustrating a detailed example method for instruction level preemption of a thread group, according to some embodiments. The method of FIG. 4 may be performed by the circuitry shown in FIG. 3, for example. More generally, the method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a driver requests a context save. In response to this request, the data master 310 may send a request to thread execution resources 320 for a context save, which may return a pointer to a private memory space for preempted threads to data master 310. Note that while the disclosed techniques are discussed in the contexts of graphics processors, this discussion is not intended to limit the scope of the present disclosure. These techniques may be used in other types of SIMD processors in other embodiments.

At 420, in the illustrated embodiment, executing threads in thread groups being context saved stop fetching and issuing new instructions and wait for any previously-issued instructions to complete. Some instructions, such as load instructions, may take longer to complete but may need to be completed before state can properly be saved. Once all previously-issued instructions have been completed, threads may be ready to execute a preempt instruction. Instructions that have been fetched but not yet issued may be flushed and will not be executed until the SIMD group is restored.

At 430, in the illustrated embodiment, arbitration circuitry 330 arbitrates among ready threads. SIMD groups that win arbitration execute a preempt instruction. The preempt instruction may be hardware-inserted into threads based on the context switch and may also be an explicit shader instruction that can be included in a thread.

At 440, in the illustrated embodiment, execution of the preempt instruction atomically accomplishes several operations for the SIMD group. First, it copies the program counter (PC), current thread valid information, and predicate information for the SIMD group into special registers 340 currently assigned to the SIMD group. Second, it sets all thread valid and predicate information for the SIMD group to an on or active state. In some embodiments, this ensures that even threads that are invalid or predicated off will still execute preemption handler code (which may be needed to save state for those threads, even if they are current not active). Third, the preempt instruction jumps to the first instruction in preemption handler code, e.g., using a branch. Example techniques for locating the preemption handler are discussed below with reference to FIG. 5.

Examples of special registers include a return register configured to store information to allow a SIMD group to return to a preempted program at the correct PC and state, one or more registers configured to store per-thread validity information prior to the preemption handler, one or more registers used to store per-thread predicate information prior to the preemption handler, a field indicating whether a threadgroup that includes the SIMD group has a private memory allocation, a virtual address associated with a threadgroup (which may be stored by the data master 310 once the threadgroup is preempted).

In some embodiments, a field may indicate whether a given SIMD group or threadgroup supports preemption. The device may avoid preempting threads that do not support this feature.

At 450, in the illustrated embodiment, the preemption handler executes and performs multiple operations. In the illustrated embodiment, the preemption handler first saves general purpose register (GPR) data for the SIMD group to the private memory space for the thread group (note that this may save data for only a subset of the GPRs, e.g., to allow sufficient GPR space to store special register contents). The preemption handler then moves special register contents into the general purpose registers and saves the register contents to the private memory space (which allows proper restoration of predicate and validity state after resumption of the thread group). In some embodiments, the preemption handler uses an mfsr (move from special register) instruction to move data from special registers to general purpose registers and similarly uses an mtsr instruction to move data from general purpose registers to special registers. The preemption handler then releases the special registers, e.g., so that they can be used by another SIMD group. Note that the system may include any of various numbers of sets of special registers such that multiple SIMD groups can use different sets of special registers in parallel. In embodiments with arbitration circuitry, however, the number of sets of special registers may be less than the number of SIMD groups wanting to save shader state, in certain situations.

The device may determine an amount of memory to reserve for a thread group based on the number of SIMD groups on the shader that make up the thread group and space for the thread group itself. Each SIMD group may need space for its GPR allocation and additional space, which may be specified by a configuration register. Each thread group may also need additional allocation for thread group memory and local image block (LIB) memory and additional space, which may similarly be specified by a configuration register. In some embodiments, the device is configured to abandon a context switch or preemption procedure if a sufficient amount of private memory space cannot be allocated. In this situation, the thread group may proceed to run until it is complete.

In some embodiments, the private memory space is accessed using load and store instructions and may be organized using a stack structure. The stack may store GPR data, followed by SIMD group-scoped state, followed by thread group-scoped state, as one example.

At 460, in the illustrated embodiment, threads continue to save remaining architectural state (e.g., additional GPR data, local memory contents, etc.) to the private memory space. Once the handler has finished its operations, it ends execution and a pointer (which may be referred to as a restoration handle) is sent to the data master 310.

At 470, in the illustrated embodiment, data master 310 stores a list of preempted thread groups and their restoration handles. This may allow the data master to access the private memory space for a thread group when it is to be resumed in order to properly restore its context.

For restoration of a thread group, the data master may launch SIMD groups based on the pointer to the restoration handle. Each SIMD group may execute a "prestore" instruction which may set all valid and predicate information for threads in the group to "on" or "executing" and jump to the first instruction of restoration handler code for the SIMD group. In some embodiments, a branch to the address of the restoration handler is placed at a fixed offset from the first instruction address of the shader.

The restoration handler may reload the architectural state from the private memory area for the thread group, placing the previous PC, thread valids, predicate values, etc. into special registers (which may be arbitrated among SIMD groups). The restoration handler may then execute a "preturn" instruction which may read the PC, validity information, and predicate information from the special registers, update the SIMD group's validity and predicate state accordingly, and unconditionally branch to the PC from the special registers to continue executing the SIMD group. After the preturn instruction, the re-launched SIMD group may proceed using its assigned hardware resources (which may or may not be the same set of hardware resources on which it initially was executing). Private memory used to store resource for preempted thread groups may be freed shortly after execution of the preturn instruction to quickly make that memory space available for other uses.

Note that various examples herein involve thread preemption, but similar context switch techniques may be utilized in various scenarios. For example, shader code may include explicit preempt and return instructions (or other context switch instructions) that atomically perform the functionality described herein for preemption/restoration. These techniques may be used for memoization, for example, in which expensive function calls may store their result for use again when the same input occur. For example, threads may use the disclosed techniques to store results in a private memory space at a certain point and the threads may be resumed to retrieve this state when the appropriate inputs occur again. In some instances, the state may be saved in private memory space and the data master may store a return PC even after the threads are resumed, allowing the threads to be called multiple times from a desired execution point. The disclosed techniques may also be useful in the context of texel shading and compression/decompression of memory. In some embodiments, the disclosed techniques may be used with hardware virtualization, e.g., allowing the programming model to assume a specific number of resources even though a particular hardware implementation may actually have fewer resources. The ability to temporarily re-purposes a group of threads to cooperatively execute some piece of work efficiently may be particularly useful in these example contexts.

The disclosed techniques may advantageously reduce latency for context switches and may provide a known upper bound on this latency. Further, disclosed techniques may allow fast context switching in the SIMD context even when some threads in a SIMD group are not active, e.g., using a multi-stage process that saves activity state (e.g., validity or predicate state) before launching a handler. Using an ISA instruction for context switching or preemption may allow use of the instruction in other scenarios as well.

Example Preemption and Restoration Handlers

Figure 5:
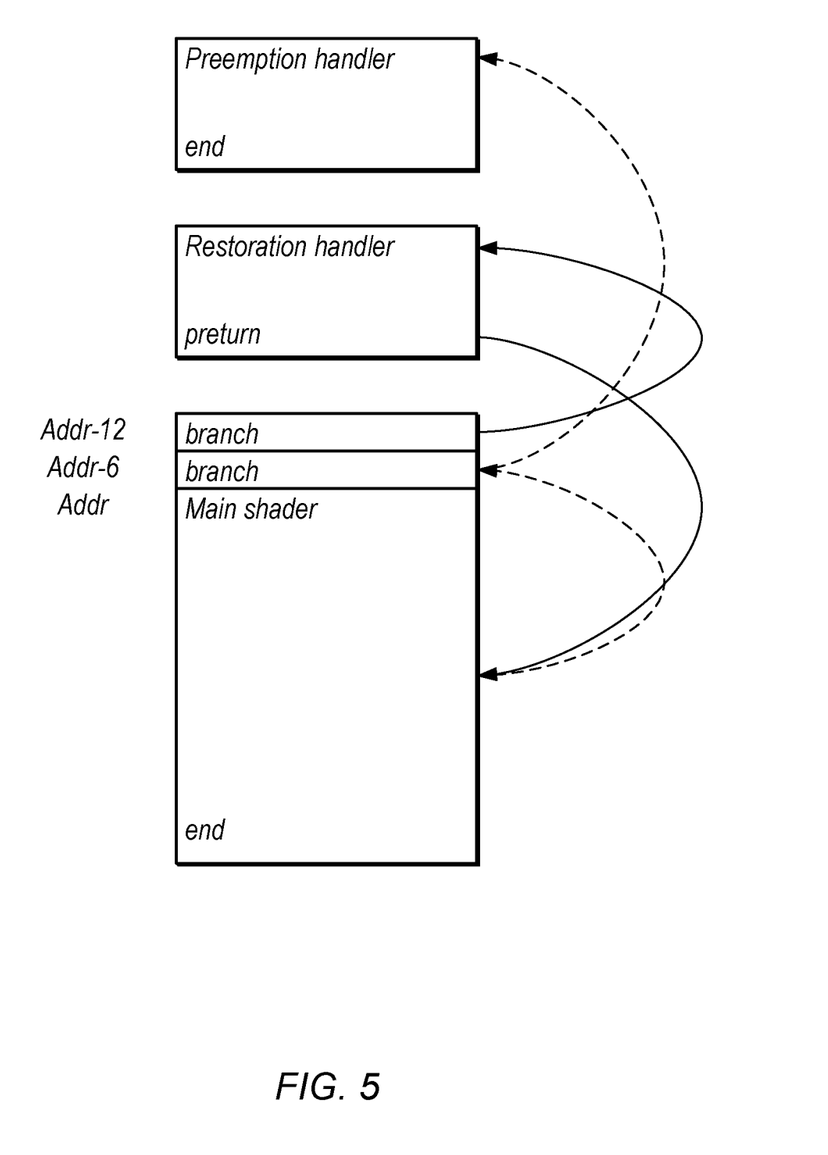
FIG. 5 is a flow diagram illustrating an example technique for locating a preemption handler and restoration handler for a shader, according to some embodiments.

FIG. 5 is a diagram illustrating example storage of a shader and its preemption handler and restoration handler. In the illustrated example, the main shader begins at address "addr," a branch to the preemption handler is stored at a known offset from the beginning of the shader "addr-6" and a branch to the restoration handler is stored at another known offset from the beginning of the shader "addr-12."

When a context switch occurs (e.g., based on a preemption instruction), the main shader jumps to the first instruction in the preemption handler code via the branch as shown using the dashed lines. When the restoration handler is called for a shader, it completes with a preturn instruction that returns execution to the main shader at the appropriate program counter. Note that the example of FIG. 5 is included for purposes of explanation but is not intended to limit the scope of the present disclosure. In other embodiments, any of various techniques may be used to specify the location of preemption or restoration handlers for a program.

Note that the preemption or restoration handlers may be customized for a given shader, e.g., by a developer in order to save the appropriate shader state. Such a handler may or may not save certain shader information that is temporary, for example. In some embodiments, a device may implement a default preemption and restoration handler, which may be configured to save and restore all state that could be used by a given shader.

Example Method

Figure 6:
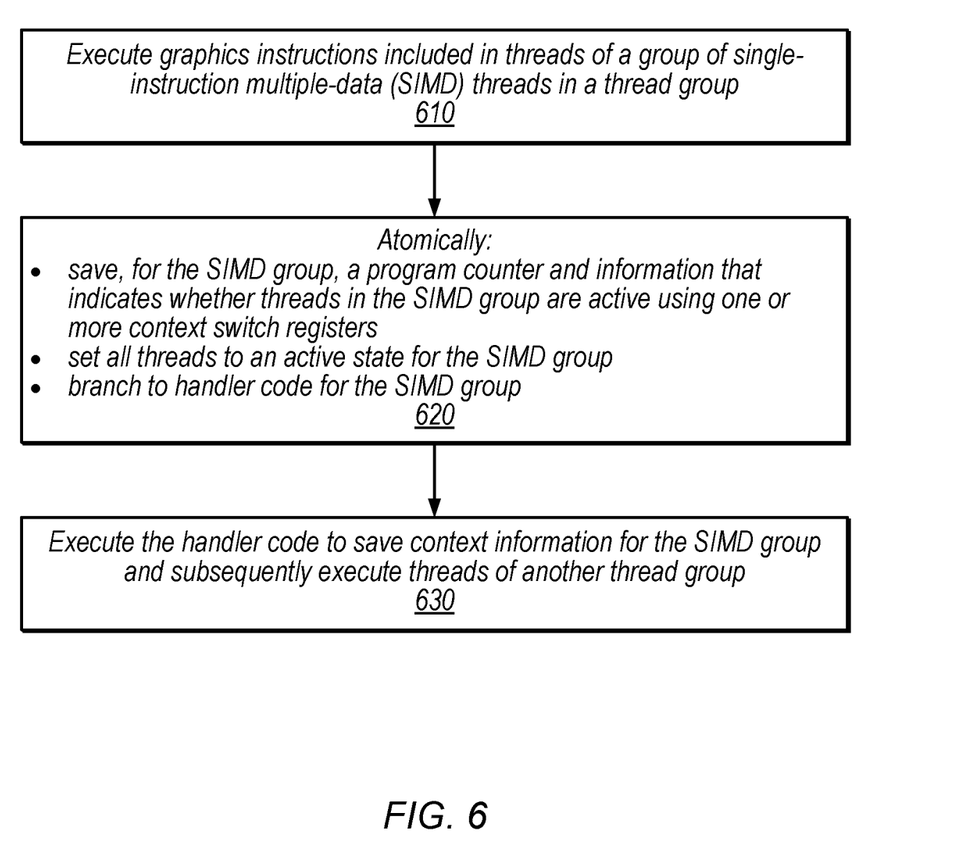
FIG. 6 is a flow diagram illustrating a method for performing a context switch, according to some embodiments.

FIG. 6 is a flow diagram illustrating a detailed example method for instruction level preemption of a thread group, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, pipeline circuitry executes graphics instructions included in threads of a group of single-instruction multiple-data (SIMD) threads in a thread group. For example, the pipeline circuitry may be a shader pipeline configured to fetch, decode, issue, and perform shader instructions.

At 620, in the illustrated embodiment, context switch circuitry atomically saves, for the SIMD group, a program counter and information that indicates whether threads in the SIMD group are active using one or more context switch registers, sets all threads to an active state for the SIMD group, and branches to handler code for the SIMD group. In some embodiments, the information that indicates whether threads in the SIMD group are active includes one or more of: validity information or predicate information. More generally, the information may specify sufficient information to record the control-flow state of each thread in the SIMD group. The context switch circuitry may perform these actions in response to a context switch or preemption request, e.g., from a driver. The atomic operations of element 620 may be performed in response to a context switch instruction (e.g., the "preempt" instruction discussed above), which may be inserted into the SIMD group in response to a context switch request. In some embodiments, the device, in response to a context switch request, stops fetching instructions for the SIMD group and waits for issued instructions for the SIMD group to complete.

At 630, in the illustrated embodiment, the device executes the handler code to save context information for the SIMD group and subsequently executes threads of another thread group. Because all the threads were set to an active state in element 620, this may allow inactive threads to save their state. Saving context information may include saving contents of the context switch registers to memory, e.g., to properly restore the activity status of threads upon restoration.

In some embodiments, the handler code is configured to store first data from one or more general-purpose registers in memory (e.g., to save GPR contents), move second data from the one or more context switch registers into the one or more general-purpose registers, and move the second data from the one or more general purpose registers to memory (e.g., in order to use normal store instructions to save the special register state to memory). In some embodiments, the handler code saves the context information for the SIMD group in a private memory area reserved for the thread group. In some embodiments, the handler requests a pointer to the private memory area and sends the pointer to scheduler circuitry configured to schedule thread groups. In some embodiments, a branch instruction is located at a known position in code for the SIMD group and indicates a location of the handler code.

In some embodiments, the context switch circuitry is further configured to, in response to a relaunch of the SIMD group, set all threads to an active state for the SIMD group and jump to a restoration handler for the SIMD group. In some embodiments, the context switch circuitry is further configured to atomically: read, for the SIMD group from the one or more context switch registers, the program counter and the information that indicates whether threads in the SIMD group are active, update the state for the SIMD group based on the read information, and branch to the program counter address to resume execution of the SIMD group.

Example Device

Figure 7:
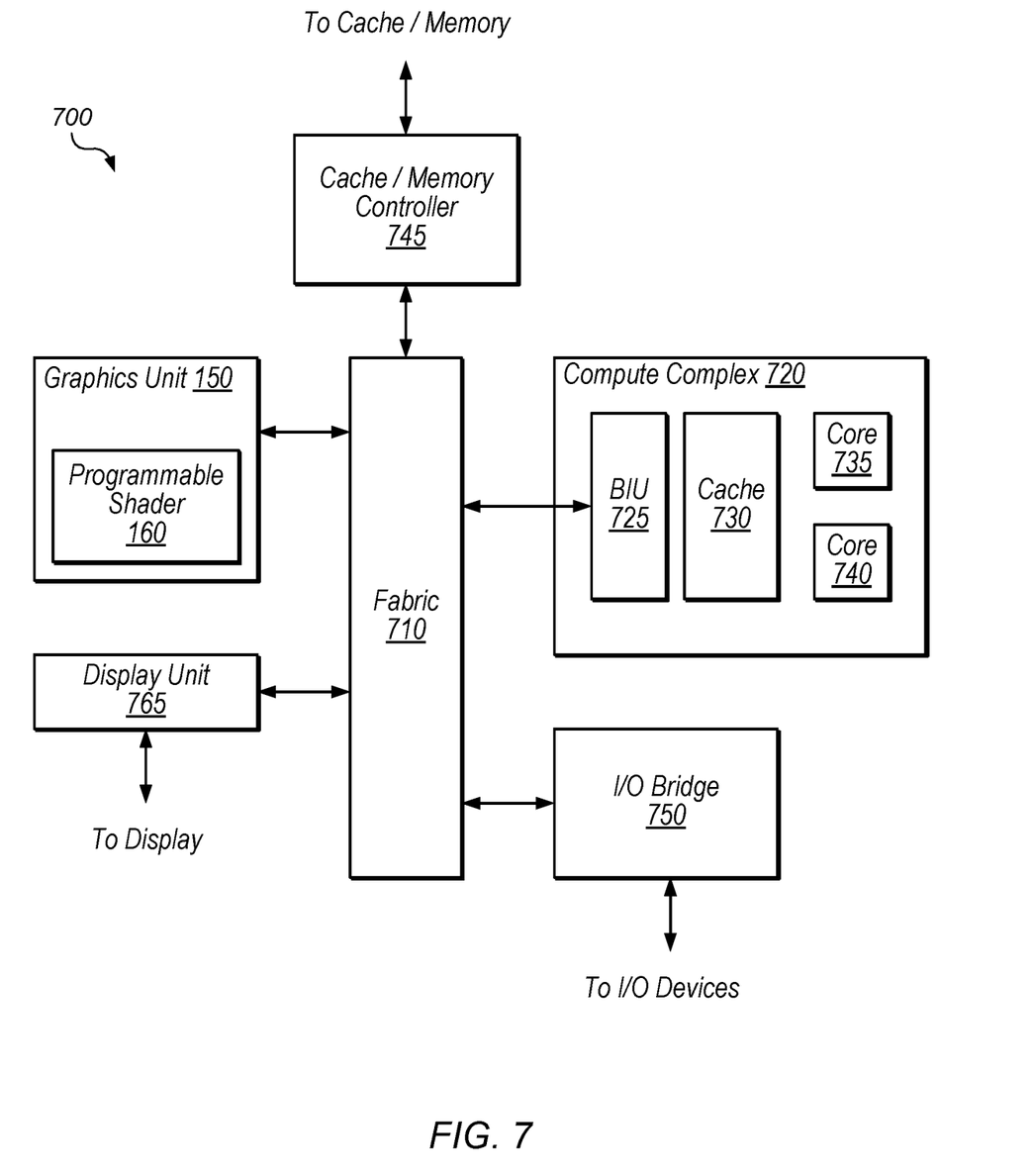
FIG. 7 is a block diagram illustrating an example computing device that may be configured to perform SIMD operations and instruction-level context switching, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 150, and display unit 765. In some embodiments, device 700 may include other components (not shown) in addition to and/or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 150 may be described as "coupled to" a memory through fabric 710 and cache/memory controller 745. In contrast, in the illustrated embodiment of FIG. 7, graphics unit 150 is "directly coupled" to fabric 710 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. Programmable shader 160, in various embodiments, may include highly parallel execution cores configured to execute graphics programs, which may include pixel tasks, vertex tasks, and compute tasks (which may or may not be graphics-related).

In some embodiments, graphics unit 150 includes the disclosed context switch circuitry, pipeline circuitry, arbitration circuitry, etc.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
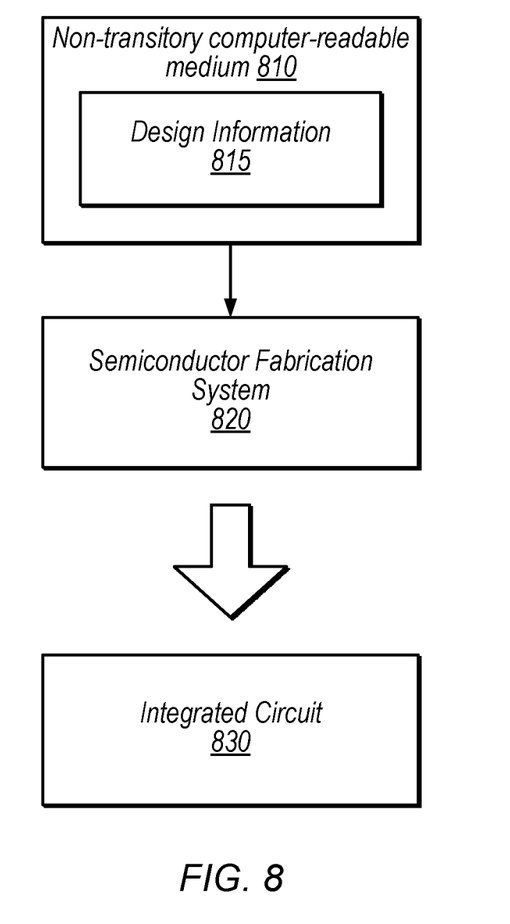
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIG. 1B, 3, or 7. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
pipeline circuitry configured to execute graphics instructions included in threads of a group of single-instruction multiple-data (SIMD) threads, wherein the SIMD group is one of multiple SIMD groups in a thread group;
context switch circuitry configured to, for a context switch away from a context of the SIMD group, atomically:
save, for the SIMD group, a program counter and information that indicates whether threads in the SIMD group are active using one or more context switch registers;
set all threads in the SIMD group to an active state; and
branch to handler code for the SIMD group;
wherein the pipeline circuitry is configured to execute the handler code to save context information for the SIMD group and subsequently execute threads of another thread group.

2. The apparatus of claim 1, wherein the context switch circuitry is configured to atomically perform the save, set, and branch operations in response to a context switch instruction.

3. The apparatus of claim 2, wherein the apparatus is configured to insert the context switch instruction into the SIMD group in response to a context switch request.

4. The apparatus of claim 1, wherein the handler code is configured to:
store first data from one or more general-purpose registers in memory;
move second data from the one or more context switch registers into the one or more general-purpose registers; and
move the second data from the one or more general purpose registers to memory.

5. The apparatus of claim 1, wherein the handler code is configured to save the context information for the SIMD group in a private memory area reserved for the thread group.

6. The apparatus of claim 5, wherein the handler code is configured to request a pointer to the private memory area and send the pointer to scheduler circuitry configured to schedule thread groups.

7. The apparatus of claim 1, wherein a branch instruction is located at a known position in code for the SIMD group and indicates a location of the handler code.

8. The apparatus of claim 1, wherein, to set all threads to an active state for the SIMD group, the context switch circuitry is configured to set one or more threads to the active state that were predicated off while the SIMD group's context was active.

9. The apparatus of claim 1, wherein the context switch circuitry is further configured to, in response to a relaunch of the SIMD group, set all threads to the active state for the SIMD group and jump to a restoration handler for the SIMD group.

10. The apparatus of claim 1, wherein the context switch circuitry is further configured to atomically:
read, for the SIMD group from the one or more context switch registers, the program counter and the information that indicates whether threads in the SIMD group are active;
update the state for the SIMD group based on the read information; and
branch to the program counter address to resume execution of the SIMD group.

11. The apparatus of claim 1, wherein the apparatus is configured to, in response to a context switch request, stop fetching instructions for the SIMD group and wait for issued instructions for the SIMD group to complete.

12. A method, comprising:
executing, by pipeline circuitry, graphics instructions included in threads of a group of single-instruction multiple-data (SIMD) threads, wherein the SIMD group is one of multiple SIMD groups in a thread group;
atomically performing, by context switch circuitry for a context switch away from a context of the SIMD group:
saving, for the SIMD group, a program counter and information that indicates whether threads in the SIMD group are active using one or more context switch registers;
setting all threads in the SIMD group to an active state; and
branching to handler code for the SIMD group; and
executing the handler code to save context information for the SIMD group and subsequently executing threads of another thread group.

13. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
pipeline circuitry configured to execute graphics instructions included in threads of a group of single-instruction multiple-data (SIMD) threads, wherein the SIMD group is one of multiple SIMD groups in a thread group;
context switch circuitry configured to, for a context switch away from a context of the SIMD group, atomically:
save, for the SIMD group, a program counter and information that indicates whether threads in the SIMD group are active using one or more context switch registers;
set all threads in the SIMD group to an active state; and
branch to handler code for the SIMD group;
wherein the pipeline circuitry is configured to execute the handler code to save context information for the SIMD group and subsequently execute threads of another thread group.

14. The non-transitory computer readable storage medium of claim 13, wherein the context switch circuitry is configured to atomically perform the save, set, and branch operations in response to a context switch instruction.

15. The non-transitory computer readable storage medium of claim 13, wherein the handler code is configured to:
store first data from one or more general-purpose registers in memory;
move second data from the one or more context switch registers into the one or more general-purpose registers; and
move the second data from the one or more general purpose registers to memory.

16. The non-transitory computer readable storage medium of claim 13, wherein, to set all threads to an active state for the SIMD group, the context switch circuitry is configured to set one or more threads to the active state that were predicated off while the SIMD group's context was active.

17. The non-transitory computer readable storage medium of claim 13, wherein the information that indicates whether threads in the SIMD group are active includes one or more of: validity information or predicate information.

18. The non-transitory computer readable storage medium of claim 13, wherein the context switch circuitry is further configured to, in response to a relaunch of the SIMD group, set all threads to an active state for the SIMD group and jump to a restoration handler for the SIMD group.

19. The non-transitory computer readable storage medium of claim 13, wherein the context switch circuitry is further configured to atomically:
read, for the SIMD group from the one or more context switch registers, the program counter and the information that indicates whether threads in the SIMD group are active;
update the state for the SIMD group based on the read information; and
branch to the program counter address to resume execution of the SIMD group.

20. The non-transitory computer readable storage medium of claim 13, wherein the circuit is configured to, in response to a context switch request, stop fetching instructions for the SIMD group and wait for issued instructions for the SIMD group to complete.

* * * * *